United States Patent [19]

Tremmel et al.

[11] 4,418,277
[45] Nov. 29, 1983

[54] APPARATUS FOR COLLECTING, TRANSMITTING AND PROCESSING DATA STORED IN CODE, PREFERABLY IN BAR CODE

[76] Inventors: Hartmut Tremmel, In der Kappisau 4, 6921 Sinsheim, Staatsange; Hartmut Bernot, Schmeilweg 3, 6900 Heidelberg, Staatsange, both of Fed. Rep. of Germany

[21] Appl. No.: 322,716

[22] Filed: Nov. 18, 1981

[30] Foreign Application Priority Data

Nov. 19, 1980 [DE] Fed. Rep. of Germany ....... 3043557

[51] Int. Cl.³ .............................................. G06K 7/10
[52] U.S. Cl. ................................... 235/472; 235/435; 235/419
[58] Field of Search ......................... 235/472, 435, 419

[56] References Cited

U.S. PATENT DOCUMENTS 3,826,900 7/1974 Moellering .......................... 235/472

Primary Examiner—Harold I. Pitts
Attorney, Agent, or Firm—Staas & Halsey

[57] ABSTRACT

An apparatus for use with merchandise bearing an optically readable code, including a portable wand reader which transmits a coded infrared signal to a stationary receiving/transmitting unit coupled to a data processor, which in turn emits a signal for transmission back to the wand so that it can be checked against the original signal in order to detect communication errors. A number of physically separated receiving/transmitting units may be coupled to the data processor in order to permit the wand to be used within a large region or in order to permit a number of wands to be used simultaneously.

A keyboard may be coupled to the wand for use with non-coded data, as when the price marked on the merchandise is verified.

6 Claims, 1 Drawing Figure

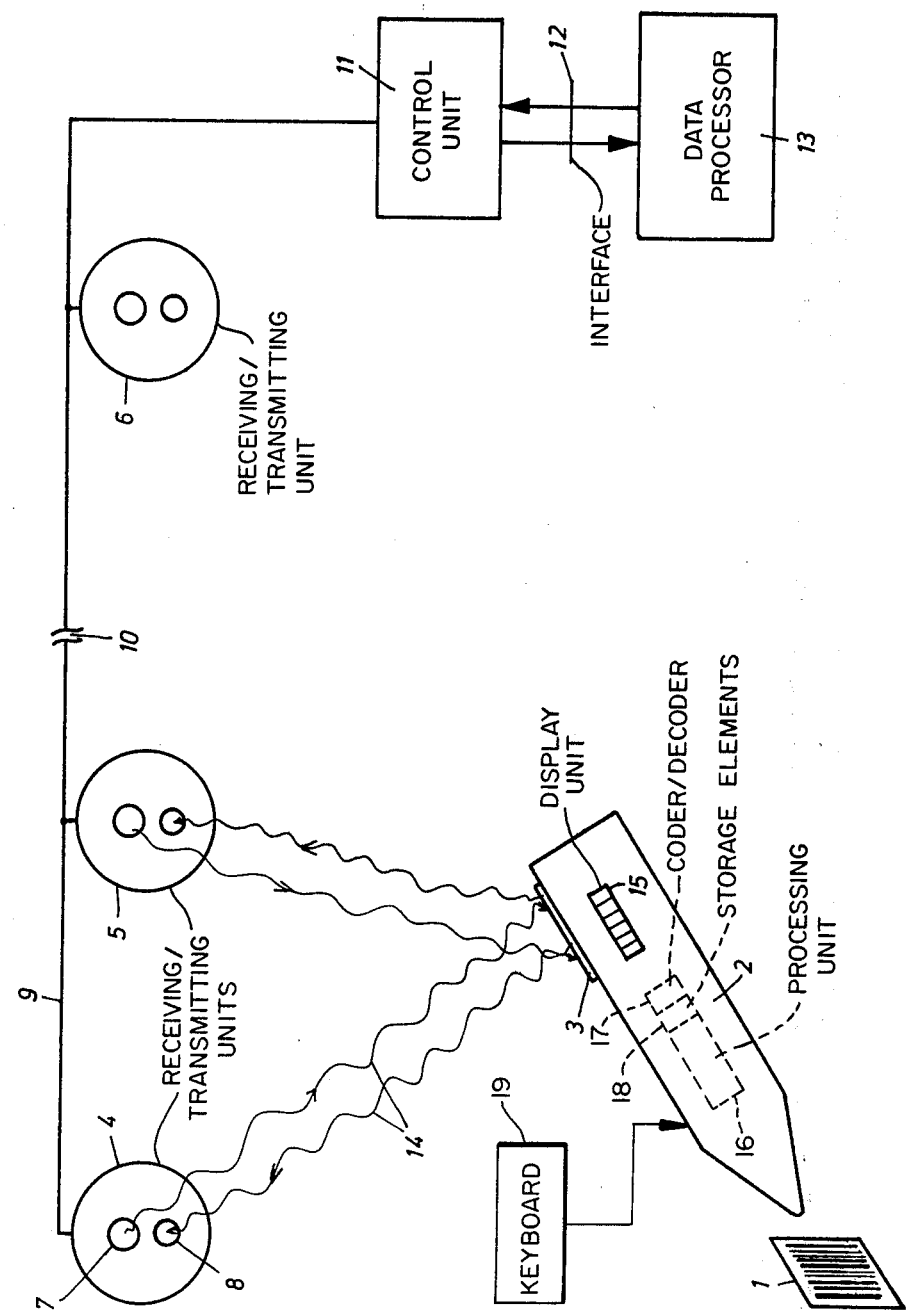

APPARATUS FOR COLLECTING, TRANSMITTING AND PROCESSING DATA STORED IN CODE, PREFERABLY IN BAR CODE

BACKGROUND OF THE INVENTION

The invention relates to a device for collecting, transmitting, and processing data stored in code, preferably in bar code, and comprising a battery-fed wand reader with a processing and transmitting unit for radiating the information in the form of electromagnetic waves, and a stationary receiver physically separated from the wand reader and to which other processing circuitry is connected.

Nowadays, an increasing number of manufacturers are providing their articles in the food as well as in the non-food trade with a machine-readable code which, for example, is a bar code in accordance with the European Articles Number (EAN). In this case, codes on coded packages can be sensed by means of gun readers or reading devices, and the codes are fed into data memories for further processing. This enables rapid, inexpensive and, above all, comprehensive monitoring of the merchandise being entered and issued.

It is common practice to connect such wand or gun readers with the recording unit by means of cables. This renders the reading unit stationary or it makes the use of an unwieldy long cable mandatory. It is likewise common practice to provide wand readers with memories and with a transmitter for radiating electromagnetic waves, the information being stored and, from time to time, transmitted to a stationary receiving station via a wireless transmission circuit. However, mobile use of such a wand or gun reader is well-nigh impossible, because it would result in an unusually high error rate. The transmission circuits employed, more particularly infrared circuits, are interference-prone because of environmental conditions.

SUMMARY OF THE INVENTION

Therefore, the primary object of the invention is to provide a device of the type referenced above in which, by means of an acknowledge message, a practically error-free transmission of information is possible without extra redundancy and the mobility of the wand reader is fully maintained.

The solution to this problem resides in the fact that, in accordance with the teachings of the invention, the wand reader is also provided with a receiving unit and the stationary receiver is used along with a transmitter for the receiver of the wand reader, and that a multiplicity of physically separated stationary receiving/transmitting units connected in parallel to one another are associated with the wand reader, the receiving/transmitting units being connected to a data processor for the processing and storing of the data and the data transfer occurring both ways from the wand reader to the data processor and vice versa.

Other embodiments of the invention are set forth in the dependent claims which, in so doing, are included in the description.

The invention has the outstanding advantage over the prior art that it produces an instantaneous transmission of the readout information to the data processor so that the data stored therein are immediately available for further processing. Moreover, an instantaneous acknowledge message from the data processor to the wand reader is possible in order to check the correctness of the readout. It is possible to display the acknowledge message via optical or acoustic means. Furthermore, the transmission paths are advantageously implemented as infrared paths. Thus, in the case of an adequately dense installation of the stationary receiving/transmitting units, a location-independent functioning of the reader is ensured.

Because information can be transmitted from the reader to the stationary receiving/transmitting units and vice versa, transmission errors of the infrared path and of the cable network can immediately be recognized and recovered by an automatic repetition of the transmission. In this way, the error rate can be reduced to a bare minimum, thus providing for great safety and low-interference susceptibility.

Also, it is possible to work with a multiplicity of readers in parallel, the latter either operating at different frequencies or being coordinated, e.g., by means of the timesharing option.

Thus, by means of the apparatus embodying the invention, complete and continuous recording of any sales and stocking event is possible at all times. The invention is particularly suitable for use in drugstores or in the pharmacy trade where, instead of a bar code, only a computer-readable label can be used as recording medium. Such labels can readily be glued to any product, or drawers and containers can be provided with such labels.

An example of the invention is illustrated in the drawing and will be described hereinafter.

BRIEF DESCRIPTION OF THE DRAWING

The FIGURE shows a diagrammatic sketch of a mobile wand reader with a multiplicity of stationary receiving/transmitting units connected in parallel to a data processing and storing system.

DESCRIPTION OF THE PREFERRED EMBODIMENTS

A wand reader 2 scans, e.g., by means of a light emitting diode, a bar code 1 found on a package containing merchandise. The wand reader 2 consists of an elongated body held in the operator's hand. Basically, this wand reader comprises a transmitting and receiving unit 3 and a processing unit 16 which includes a coder/decoder 17 and, optionally, storage elements 18. The readout information is coded within the coder/decoder and radiated in the form of electromagnetic waves by means of the transmitter. Preferably, the operation takes place in the infrared spectrum. Data can be transmitted and received by unit 3.

Associated with this wand reader 2 are a series of stationary receiving/transmitting units 4, 5, 6 connected in parallel via line 9 leading to a control unit 11.

The control unit 11 is connected via a standard interface, e.g., V24, ASC II-code, with a data processor 13 and/or storage device.

Now, after receipt of data from the reader, it is possible to send immediately an acknowledge message from the processor by means of the stationary receiving/transmitting units 4, 5, 6 to the reader, said acknowledge message occurring preferably in the infrared spectrum also. In this way, the information read by the reader can be checked and, if it differs from the originally transmitted information, a command for sensing the same data can be automatically repeated until agreement is found between the data read by the reader and the data in the acknowledge message from the processor, so that errors in the transmission circuit can substantially be recovered and avoided. To this end, the wand reader can be provided with an optical or acoustic display unit 15 with a storage unit in order briefly to store and display the information transmitted by the data processor 13.

It is likewise possible to assign a plurality of readers to a multiplicity of stationary receiving/transmitting units. These readers can operate at different frequencies or they can be coordinated with one another, e.g., in accordance with the time-sharing option.

According to the FIGURE, each receiving/transmitting unit 4, 5, 6 has a transmitter 7 and a receiver 8 represented by two circles. It goes without saying that a multiplicity of stationary receiving/transmitting units can be placed in line 9. This is indicated by the break at 10 in line 9. The standard interface 12 is placed between the control unit 11 and the data processor.

Furthermore, the wand may optionally be used with a keyboard unit 19 for the manual input of data. This input unit may, for instance, be a simple keyboard or an alphanumeric keyboard. In this way, in response to an item of information, a reply can be sent both ways, either from the data processor to the wand reader, or from the data processor to the wand reader, during which corrections or additional information can advantageously be input via the keyboard. For example, in response to bar code information from the wand reader the data processor can show the proper manually entered price in its display unit.

Moreover, the device embodying the invention can in a simple way be utilized as a paging system, in which call signals or paging information can be sent from the data processor to the individual wand readers or their carriers.

Advantageously, the present invention can be employed for a multiplicity of codes, in particular for bar codes or for optically readable codes. Therefore, the invention can be used for inventory control, more particularly in the pharmaceutical trade and in durgstores so that, for example, dispensaryspecific sales transactions can be reduced to the bare essentials.

What we claim is:

1. An improved apparatus for collecting, transmitting, and processing data stored in a code such as a bar code, said apparatus including a portable wand reader with processing and transmitting units for radiating information in the form of electromagnetic waves, a stationary receiver physically separated from the wand reader, and a data processor coupled to the stationary receiver, wherein the improvement comprises: the wand reader also has a receiving unit, the stationary receiver is part of a stationary receiving/transmitting unit which includes a transmitter for the receiver of the wand reader, and a plurality of physically separated stationary receiving/transmitting units connected in parallel to one another are associated with the wand reader, the receiving/transmitting units being coupled to the data processor for the processing and storing of the data and the data transfer occurring both ways from the wand reader to the data processor and vice versa.

2. An apparatus as set forth in claim 1, wherein the processing unit of the wand reader includes storage elements.

3. An apparatus as set forth in claim 2, wherein the wand reader has one of an optical and an acoustic display unit.

4. An apparatus as set forth in claims 1, 2, or 3, wherein the transmission circuits of the wand reader and the stationary receiving/transmitting units are infrared transmission circuits.

5. A device as set forth in claim 4, wherein the stationary receiving/transmitting units are associated with a plurality of portable wand readers which either operate at different frequencies or are coordinated with one another to operate on a time-sharing basis.

6. An apparatus as set forth in claim 5, further comprising keyboard unit means for the manual input of data to the wand reader.

* * * * *